US007826521B1

(12) United States Patent
Sun et al.

(10) Patent No.: US 7,826,521 B1
(45) Date of Patent: Nov. 2, 2010

(54) RATE ADAPTATION USING ERROR VECTOR MAGNITUDE

(75) Inventors: Qinfang Sun, Cupertino, CA (US); Paul Petrus, Santa Clara, CA (US)

(73) Assignee: Atheros Communications, Inc., San Jose, CA (US)

( * ) Notice: Subject to any disclaimer, the term of this patent is extended or adjusted under 35 U.S.C. 154(b) by 832 days.

(21) Appl. No.: 11/680,535

(22) Filed: Feb. 28, 2007

(51) Int. Cl.
 *H04B 3/46* (2006.01)
(52) U.S. Cl. ............... 375/225; 375/224; 375/346; 375/147
(58) Field of Classification Search .......... 375/225
 See application file for complete search history.

(56) References Cited

U.S. PATENT DOCUMENTS

| 5,862,451 | A  | * | 1/1999  | Grau et al. ............... 725/116 |
| 6,757,522 | B1 | * | 6/2004  | Naegeli et al. ......... 455/67.11 |
| 6,898,198 | B1 | * | 5/2005  | Ryan et al. .............. 370/338 |
| 6,917,389 | B2 | * | 7/2005  | Lee ......................... 348/608 |
| 7,315,578 | B2 | * | 1/2008  | Cheng ...................... 375/261 |
| 7,411,935 | B2 | * | 8/2008  | Ryan et al. .............. 370/338 |
| 7,505,367 | B2 | * | 3/2009  | Abdi ....................... 367/134 |
| 7,561,048 | B2 | * | 7/2009  | Yushkov et al. ...... 340/572.1 |
| 2003/0105409 | A1 | * | 6/2003 | Donoghue et al. ....... 600/545 |
| 2006/0245347 | A1 | * | 11/2006 | Jayaraman et al. ...... 370/208 |
| 2006/0280263 | A1 | * | 12/2006 | Yang ....................... 375/316 |
| 2007/0099577 | A1 | * | 5/2007  | Lee et al. .................. 455/69 |
| 2007/0139200 | A1 | * | 6/2007  | Yushkov et al. ...... 340/572.1 |
| 2007/0206695 | A1 | * | 9/2007  | Ye et al. ................... 375/267 |
| 2007/0237269 | A1 | * | 10/2007 | Lillo et al. ............... 375/343 |
| 2007/0258366 | A1 | * | 11/2007 | Imamura .................. 370/230 |
| 2008/0056181 | A1 | * | 3/2008  | Imamura et al. ......... 370/329 |
| 2008/0207143 | A1 | * | 8/2008  | Skarby et al. ........... 455/103 |
| 2008/0268857 | A1 | * | 10/2008 | McCoy et al. ........... 455/447 |
| 2009/0207930 | A1 | * | 8/2009  | Sirkeci et al. ........... 375/267 |

\* cited by examiner

*Primary Examiner*—Chieh M Fan
*Assistant Examiner*—Santiago Garcia
(74) *Attorney, Agent, or Firm*—Bever, Hoffman & Harms, LLP; Jeanette S. Harms (57) ABSTRACT

Rate adaptation is accurately provided by using an average SNR technique, a predicted PER technique, or an EVM to PER mapping technique. An average SNR is computed by averaging EVM values in a particular domain. Using the computed average SNR, an optimized rate is determined. The predicted PER technique includes computing EVM values for a current packet, determining an average BER using these EVM values for each data rate, determining an average SNR from this average BER, using the average SNR and a PER versus SNR curve to determine the predicted PER for each data rate, and using a data rate and the predicted PER to compute the predicted throughput for that data rate. In the last technique, an EVM is mapped to a packet error rate (PER) for each data rate. A throughput is computed for each data rate and PER. A data rate with a high throughput is selected.

9 Claims, 12 Drawing Sheets

SNR to BER Conversion

701

```
function ber = snr2ber(snr, msb, QAM);

% computes ber for given snr based on bit location and QAM using Q-function
% if bit location is not specified, computes average BER for all bit locations % Q(x) = erfc(x/sqrt(2))/2
Kmod_table = [1 2 10 42];
% cell index is QAM, first column is MSB
Nb_table{1} = [1];
Nb_table{2} = [1];
Nb_table{3} = [1/2 1];
Nb_table{4} = [1/4 1/2 1];

Kmod = Kmod_table(QAM);
if isempty(msb)
    Nb = mean(Nb_table{QAM});
else
    Nb = Nb_table{QAM}(msb);
end
ber = Nb.*erfc(10.^(snr/20)/sqrt(Kmod))/2;
```

Figure 7A

BER to SNR Conversion                                702

```
function snr = ber2snr(ber, msb, QAM);

% computes SNR corresponding to given ber
% in/out are scalars, not vectors

% set lower bound and upper bound for search range
snr1 = -10;
snr2 = 40;
while snr2ber(snr1, msb, QAM) < ber
  snr2 = snr1;
  snr1 = snr1 - 5;
end
while snr2ber(snr2, msb, QAM) > ber
  snr1 = snr2;
  snr2 = snr2 + 5;
end while (snr2-snr1) > 0.005
  % try the value in the middle
  snr = (snr1+snr2)/2;
  this_ber = snr2ber(snr, msb, QAM);
  % reduce the search range in half
  if this_ber > ber
    snr1 = snr;
  else
    snr2 = snr;
  end
end % verification
if (0)
  eff_ber = snr2ber(snr, msb, QAM);
  fprintf(1, 'given ber = %e, ber for computed snr =%e\n', ber, eff_ber);
end
```

Figure 7B

Ideal EVM to Raw EVM Conversion     703 function evm = snr2evm(snr, QAM)
% compute the data evm from hard slicing - captures systematic error
% due to wrong decision - assuming Gaussian random noise % signal power assuming +/-1, +/-3, ... constellation points (for easy
% integration)
 Ex_table = [1 2 10 42];
 Ex = Ex_table(QAM);

% noise power per dimension
sigma = sqrt(Ex)*10.^(-snr/20)/sqrt(2);

% compute average error variance in all dimension
switch QAM
 case 1
  % just add sigma^2 for imaginary part
  eff_sigma_sq = 2*sigma.^2 + 4*phi(1, sigma);

Figure 7C

```
                                                        704
case 2
  % imaginary part = real part, double
  eff_sigma_sq = 2*(sigma.^2 + 4*phi(1, sigma));

case 3
  eff_sigma_sq = 2*(sigma.^2 + 6*phi(1, sigma)+4*phi(3, sigma)+2*phi(5,sigma));

case 4
  eff_sigma_sq = 2*(sigma.^2 + 7*phi(1, sigma) + 6*phi(3, sigma) + 5*phi(5, sigma) ...
                  + 4*phi(7, sigma) + 3*phi(9, sigma) + 2*phi(11,sigma)...
                  + phi(13, sigma));
end % compute resulting evm
evm = 10*log10(Ex./eff_sigma_sq);

function y = phi(x, sigma)
  % x is scaler, sigma can be vector
  y = x.*erfc(x./sigma/sqrt(2))/2 - sigma/sqrt(2*pi).*exp(-x^2./(2* ...
                                    sigma.^2));
```

Figure 7D

Raw EVM to Ideal EVM Conversion      705

```
function snr = evm2snr(evm, QAM)

% converts data evm values back to snr using theoretical correction for k = 1:length(evm)
   % first pick a range for SNR search
   % upper bound is evm because evm>snr
   % lower bound from trial and error
   snr2 = evm(k);
   snr1 = snr2-4;
   while snr2evm(snr1, QAM) > evm(k)
       snr1 = snr1-2;
   end % now use binary search
   while (snr2-snr1 > 0.05)
       this_snr = (snr1+snr2)/2;
       this_evm = snr2evm(this_snr, QAM);

if this_evm > evm(k)
         snr2 = this_snr;
       else
         snr1 = this_snr;
       end
   end snr(k) = (snr1+snr2)/2;
 end
```

RATE ADAPTATION USING ERROR VECTOR MAGNITUDE

BACKGROUND OF THE INVENTION

1. Field of the Invention

The present invention relates to rate adaptation in a radio frequency (RF) communication system and in particular to rate adaptation using error vector magnitude values for RF devices supporting spatial multiplexing multiple-input multiple-output communication.

2. Related Art

The purpose of rate adaptation is to maximize the throughput of a radio frequency (RF) communication system by choosing the best data rate for given channel conditions. Typically, rate adaptation is based on a received signal strength indication (RSSI) and an (SNR, rate) lookup table (i.e. a table in which selecting a signal-to-noise ratio (SNR) indicates a corresponding rate). The RSSI is an accurate measurement of signal quality for single stream transmissions. However, where spatial multiplexing multiple-input multiple-output (MIMO) communication is supported in the RF device (e.g. receiver, transmitter, and/or transceiver), the RSSI no longer accurately reflects the quality of a received data stream. Therefore, a need arises for an accurate rate adaptation technique for RF devices supporting spatial multiplexing MIMO communication.

SUMMARY OF THE INVENTION

Rate adaptation for RF devices supporting spatial multiplexing MIMO may be accurately provided by using an average signal-to-noise ratio (SNR) technique, a predicted packet error rate (PER) technique, or an error vector magnitude (EVM) to PER mapping technique.

In the SNR technique, an average SNR may be computed by averaging EVM values in a linear domain, a logarithmic domain, or a BER domain. Note that the EVM values may include pilot EVM and/or data EVM values. Using the computed average SNR, an optimized rate may be chosen from an (SNR, rate) lookup table.

Computing the average SNR in the BER domain may include computing a bit error rate (BER) for each EVM value. At this point, an average BER may be computed for all BERs. Then, an SNR corresponding to the average BER may be determined.

The predicted PER technique may include computing EVM values for a current packet. For each data rate, an average BER may be determined using these EVM values. From this average BER, an average signal-to-noise ratio (SNR) may be determined. Using the average SNR and a PER versus SNR curve for each data rate, the predicted PER may be determined. At this point, using a data rate and the predicted PER, the predicted throughput for that data rate may be computed. The rate having a high predicted throughput may be selected.

Generating the PER versus SNR curves may include simulating PER versus SNR curves for an additive white Gaussian noise (AWGN) channel for all data rates. These PER versus SNR curves may be saved, e.g. in a lookup table.

In one embodiment, determining the average BER may include averaging a BER over all bins with EVM values, thereby providing a global average BER. In another embodiment, determining the average BER may include computing a local average BER for a de-interleaved bit sequence. Computing the local average BER may include, for each data bin, computing a BER of each data bit using data EVM values, a modulation type, and a bit position. At this point, all BER values may be de-interleaved. Using the de-interleaved BER values, the local average BER may be computed in a sliding window format.

In EVM to PER mapping technique, the EVM may be mapped to a PER for each data rate. A throughput may be computed for each data rate and PER. A data rate with a high throughput may be selected.

Mapping the EVM to the PER may include estimating EVMs of pilots for each data symbol in a packet. An average EVM per pilot across all data symbols in the packet may be computed. At this point, a mean EVM and a standard deviation for each stream may be estimated. The mean EVM and the standard deviation for all streams may then be computed. Using the mean EVM and standard deviation, an effective EVM may be computed. Using a lookup table, the EVM may be mapped to the PER.

BRIEF DESCRIPTION OF THE FIGURES

FIGS. 7A-7E illustrate Matlab codes that describe aspects of the embodiments provided herein, e.g.
FIG. 7A illustrates code for SNR to BER conversion,
FIG. 7B illustrates code for BER to SNR conversion,
FIGS. 7C and 7D illustrate code for ideal EVM to raw EVM conversion,
and FIG. 7E illustrates code for raw EVM to ideal EVM conversion.

DETAILED DESCRIPTION OF THE FIGURES

For RF devices that support spatial multiplexing MIMO communication, the RSSI no longer accurately reflects the quality of a transmitted data stream. In accordance with various embodiments of the invention, rate adaptation methods based on error vector magnitude (EVM) can be advantageously used to accurately determine the quality of a received data stream.

These rate adaptation methods fall into two general techniques. In a first technique, an average SNR is computed (using EVM values from one of various domains) and a rate from an (SNR, rate) lookup table may then be chosen. In a second technique, the packet error rate (PER) may be predicted from EVM values and a rate to maximize the predicted throughput may then be chosen. These two techniques are described in detail below after an overview of EVM.

EVM: Overview

EVM is a metric used to measure the performance of an RF device. A signal that is processed for transmission is typically modulated in some way, e.g. by phase-shift keying (PSK) or quadrature amplitude modulation (QAM). A representation of a received modulated signal can be captured in a constellation diagram.

Figure 1A:
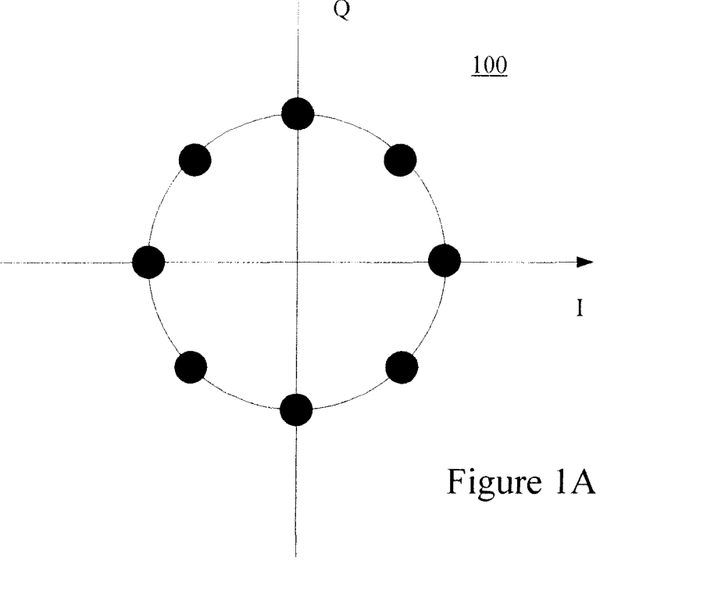
FIG. 1A illustrates a constellation diagram for 8-PSK.
Figure 1B:
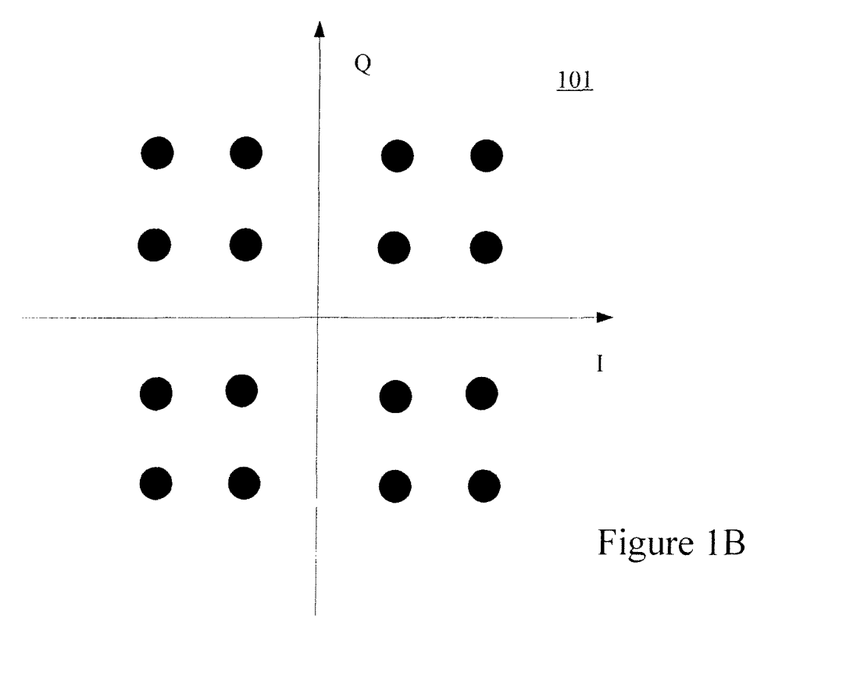
FIG. 1B illustrates a constellation diagram for 16 QAM.

A signal (after channel correction) received by an ideal RF device has all of its constellation points precisely at ideal locations. For example, FIG. 1A illustrates a constellation diagram 100 for 8-PSK (i.e. 8 constellation points), whereas FIG. 1B illustrates a constellation diagram 101 for 16 QAM (i.e. 16 constellation points). However, RF device imperfections can cause the actual locations of these constellation points to vary from their ideal locations.

EVM measures how far the constellation points are from their ideal locations. Note that both constellation diagrams 100 and 101 have an I-axis (in-phase or real) and a Q-axis (quadrature or imaginary). Therefore, any symbol of a received signal can be characterized as a point on this I-Q plane.

Where the symbol after channel correction is x, and the ideal symbol is s, then the EVM is defined by the following equation:

$$EVM = 10 \log 10 \left( \frac{E|s|^2}{E|x-s|^2} \right)$$

where the expectation E is computed for all the symbols in a given frequency bin over the entire packet.

Because pilot symbols are known at the RF device, pilot EVMs can be computed accurately. On the other hand, data symbols are unknown at the RF device and can be estimated for the EVM estimation. To avoid latency, s can be estimated from x by hard slicing (e.g. in PSK, determining the constellation quadrant and then the closest constellation point in that constellation quadrant). Note that when the detection SNR is low (e.g. when noise is very large compared to the signal), hard slicing may introduce decision errors and lead to smaller error estimates, or greater EVM values.

For example, if the signal is BPSK modulated, then the ideal symbol is s=±1, and the noise n is a Gaussian random variable with variance σ per dimension (i.e. I and Q dimensions). Using the above information, the effective error after hard slicing given s=+1 is:

$$e(s=+1) = x - \hat{s} = (s+n) - \hat{s} = \begin{cases} (1+n) - 1 = n, & n > -1 \\ (1+n) - (-1) = n+2, & n < -1 \end{cases}$$

Therefore, the mean square error is:

$$E|e^2| = \int_{-\infty}^{-1} (n+2)^2 \cdot \frac{1}{\sqrt{2\pi}\,\sigma} e^{-n^2/2\sigma^2} dn + \int_{-1}^{+\infty} n^2 \cdot \frac{1}{\sqrt{2\pi}\,\sigma} e^{-n^2/2\sigma^2} dn$$

Note that the above integration can be worked out in closed form.

After repeating the same process for all of the constellation points and both I and Q dimensions (wherein symmetry can simplify this process in one embodiment), the average mean square error and then EVM can be computed. The result of this computation is summarized in the following equations (for modulations BPSK, QPSK, 16QAM, and 64QAM), which give the mapping from ideal EVM ($\gamma_0$) to measured EVM ($\gamma$). In these equations, a special function $\Phi(m, \sigma)$ is defined as, $$\Phi(m, \sigma) = \frac{m}{2} erfc\left(\frac{m}{\sqrt{2}\,\sigma}\right) - \frac{\sigma}{\sqrt{2\pi}} e^{-\frac{m^2}{2\sigma^2}}.$$

$$BPSK: \gamma = \frac{1}{2\sigma^2 + 4\Phi(1, \sigma)}, \text{ where } \sigma = \sqrt{\frac{1}{\gamma_0}}$$

$$QPSK: \gamma = \frac{1}{\sigma^2 + 4\Phi(1, \sigma)}, \text{ where } \sigma = \sqrt{\frac{1}{\gamma_0}}$$

$$16QAM: \gamma = \frac{5}{\sigma^2 + 6\Phi(1, \sigma) + 4\Phi(3, \sigma) + 2\Phi(5, \sigma)},$$

$$\text{where } \sigma = \sqrt{\frac{5}{\gamma_0}}$$

$$64QAM: \gamma = \frac{21}{\sigma^2 + \sum_{k=0}^{6} (7-k)\Phi(2k+1, \sigma)}, \text{ where } \sigma = \sqrt{\frac{21}{\gamma_0}}$$

Notably, because the raw EVM is what can be measured and the ideal EVM are what is desired, the above equations may be advantageously used backwards to convert the raw EVM ($\gamma$) to the ideal EVM ($\gamma_0$).

Rate Adaptation Using Average SNR

The average SNR can be computed by using one of three techniques, each technique using EVM values in a particular domain. Note that there are 4 pilots EVM values and 48 data EVM values for each data stream. Therefore, the average SNR may be computed using the pilot EVM values and/or the data EVM values.

In a first technique, the average SNR can be computed by averaging EVM values in a linear domain, i.e. SNR (linear) =mean (EVM (linear)). In a second technique, the average SNR can be computed by averaging EVM values in a log domain, i.e. SNR (dB)=mean (EVM (dB)). In a third technique, the average SNR can be computed by averaging EVM values in a bit error rate (BER) domain. After determining the average SNR (using any of the three techniques), a rate from an (SNR, rate) lookup table may then be chosen.

Regarding the third technique, note that because the overall BER is an average of the BER of each bin (i.e. a band of frequencies of a specific width), the average SNR should give the same BER as the average of the BER values computed from the EVM values. The BER (ber) for a given SNR (dB) and modulation are computed as follows:

$$ber = \frac{1}{2} erfc(10^{SNR/20}) \quad (BPSK)$$

$$ber = \frac{1}{2} erfc\left(\frac{10^{SNR/20}}{\sqrt{2}}\right) \quad (QPSK)$$

$$ber = \frac{3}{8} erfc\left(\frac{10^{SNR/20}}{\sqrt{10}}\right) \quad (16QAM)$$

$$ber = \frac{7}{24} erfc\left(\frac{10^{SNR/20}}{\sqrt{42}}\right) \quad (64QAM)$$

wherein the "erfc" refers to an error function (complementary) defined as:

$$erfc(x) = \frac{2}{\sqrt{\pi}} \int_x^\infty e^{-t^2} dt = 1 - erf(x)$$

Figure 1C:
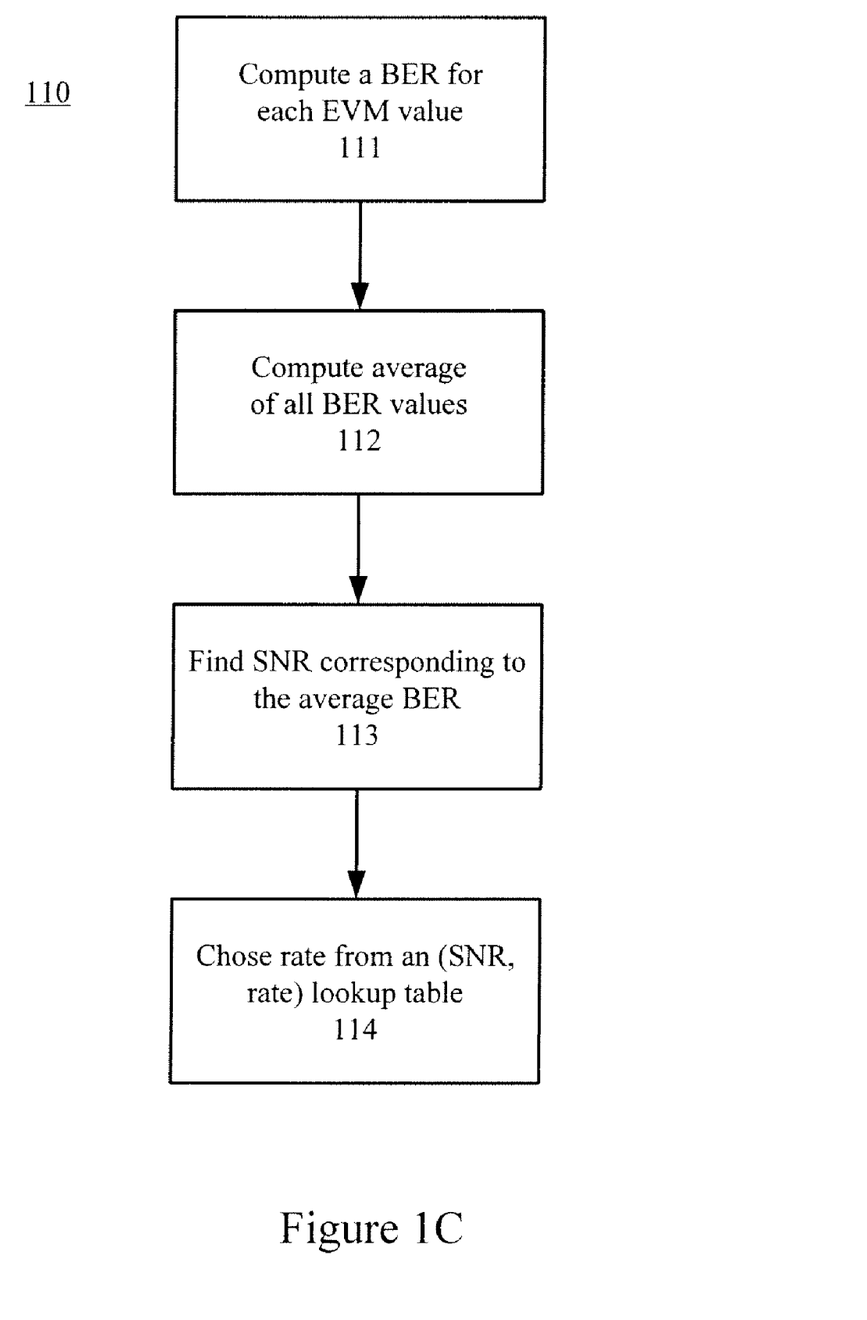
FIG. 1C illustrates a rate adaptation technique that includes computing an average SNR by using error vector magnitude values in a bit error rate domain.

FIG. 1C illustrates an exemplary technique 110 for rate adaptation using an average SNR, wherein the average SNR is computed using EVM values in a BER domain. In technique 110, step 111 computes a BER for each EVM value using the above formulas. Step 112 computes the average of all the BER values provided in step 111. Step 113 finds the SNR corresponding to the average BER using the inverse of the above formulas. In one embodiment, this inversion can be implemented as lookup tables. In another embodiment, this inversion can be computed iteratively using a series of converging SNR values (e.g. using the method of binary search). In step 114, a rate from an (SNR, rate) lookup table may then be chosen. Note that computing the SNR by averaging EVM values in each of the three domains provides a different tradeoff between performance and complexity. The order of complexity from low to high is averaging in the log domain, averaging in the linear domain, and averaging in the BER domain.

To compare the performance of averaging in the three domains, four simulations may be performed. First, the PER versus SNR curve for an additive white Gaussian noise (AWGN) channel may be simulated. Second, a random multipath fading channel may be generated. Using this random multipath fading channel, the PER can be simulated. Then, the pilot EVM and data EVM values can be recorded. Third, the average SNR using the above averaging techniques for all three domains can be computed. Fourth, the corresponding PER using the average SNR and the PER versus SNR curve of the AWGN channel can be found, wherein the closer the PER is to the simulated PER, the better the method. In one embodiment, averaging in the BER domain gives the best performance, followed by averaging in the log domain and averaging in the linear domain.

Rate Adaptation Using Predicted PER

A PER can be predicted from the average SNR and the (PER, SNR) curves of the AWGN channel. In this rate adaptation technique, the average SNR may be computed in the BER domain with two variations: a global average BER and a local average BER. This technique is based on an assumption that an average SNR in the BER domain yields a reasonable PER prediction.

Figure 2:
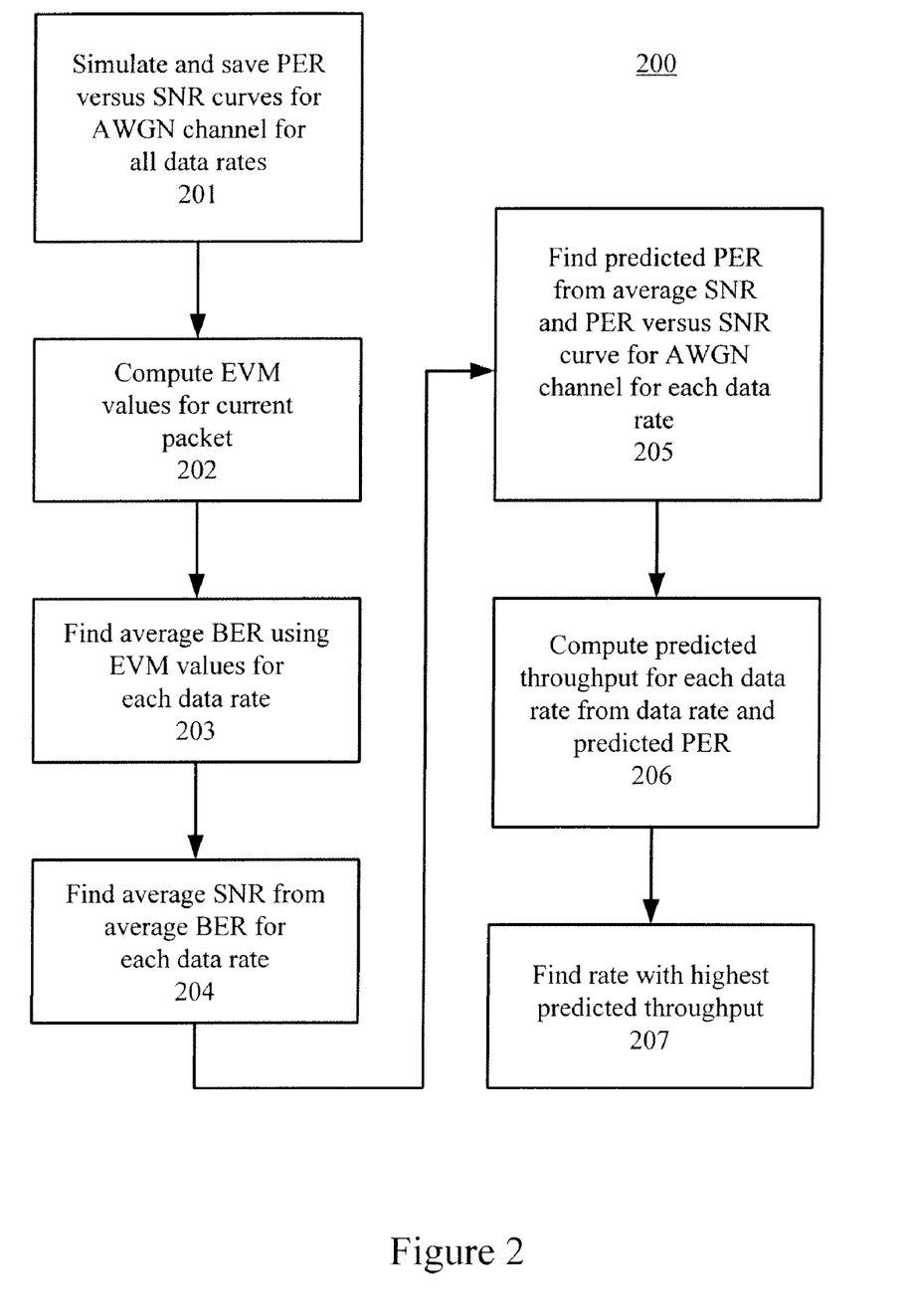
FIG. 2 illustrates an exemplary technique for rate adaptation using a predicted PER.

FIG. 2 illustrates an exemplary technique 200 for rate adaptation using a predicted PER. In technique 200, step 201 simulates and then saves PER versus SNR curves for the AWGN channel for all data rates. Step 202 computes the EVM values for the current packet. Step 203 finds the average BER using the EVM values for each data rate (explained in further detail below). Step 204 finds the average SNR from the average BER using the inverse of the formulas in 3.1.1.3 for each data rate. Step 205 finds the predicted PER from the average SNR and the PER versus SNR curve for the AWGN channel for each data rate. Step 206 computes the predicted throughput for each data rate from the data rate and the predicted PER. Step 207 finds the rate with the highest predicted throughput.

Computing An Average BER

Two methods may be used to compute the average BER: a global average BER method and a local average BER method. In a global average BER method, the BER is averaged over all the bins with EVM values, i.e. 4 pilot bins for pilot EVM and 48 bins for data EVM. Note that the global average BER is meaningful if the bit errors are evenly distributed after "de-interleaving". That is, redundant bits are provided with data bits according to IEEE 802.11n (the data bits and the redundant bits being interleaved at the transmitter). Therefore, these bits must be de-interleaved when the signal is received.

Note that the actual bit error distribution after de-interleaving may depend on the channel response, the modulation type, and the interleaved pattern. Unfortunately, clusters of bad bits may dominate the PER performance. In this case, computing the average BER using a local average method is appropriate. Specifically, the local average BER may be computed for the de-interleaved bit sequence and the worst local average BER may be used to then compute an average SNR. In one embodiment, this method uses the 48 data EVM values.

Figure 3:
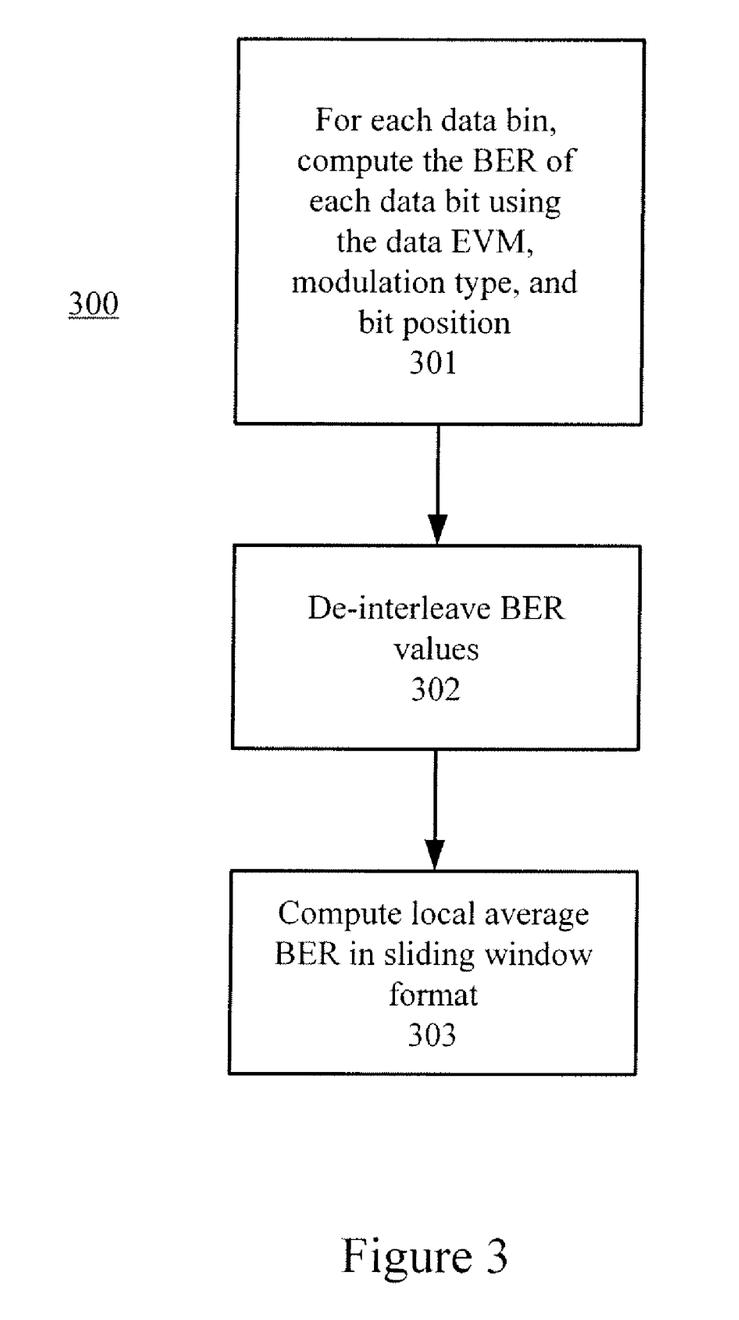
FIG. 3 illustrates an exemplary technique for computing the average BER using a local average.

FIG. 3 illustrates an exemplary technique 300 for computing the average BER using a local average. In step 301 of technique 300, for each data bin, the BER of each data bit is computed using the data EVM, modulation type, and the bit position (i.e. most-significant bit (MSB), least-significant bit (LSB), etc.). Note that the BER (ber) formulas for BPSK and QPSK are those previously presented. The BER formulas for 16QAM and 64QAM (MSB and LSB) are:

$$MSB: ber = \frac{1}{4} erfc\left(\frac{10^{SNR/20}}{\sqrt{10}}\right), LSB: ber = \frac{1}{2} erfc\left(\frac{10^{SNR/20}}{\sqrt{10}}\right)(16QAM)$$

$$MSB: ber = \frac{1}{8} erfc\left(\frac{10^{SNR/20}}{\sqrt{42}}\right), MidBit: ber = \frac{1}{4} erfc\left(\frac{10^{SNR/20}}{\sqrt{42}}\right),$$

$$LSB: ber = \frac{1}{2} erfc\left(\frac{10^{SNR/20}}{\sqrt{42}}\right)(64QAM)$$

Step 302 de-interleaves the BER values, e.g. in the same way as the data bits are de-interleaved. Step 303 computes the local average BER in a "sliding window" format using the de-interleaved BER sequence. Note that the length of the sliding window can be empirically optimized. In one embodiment, the length of the sliding window may be 20 bits. Note that when the window length equals the number of bits per data symbol, the local average BER is the same as the global average BER. In one embodiment, to include the impact of code puncturing, the punctured bits can be re-inserted after de-interleaving, wherein each re-inserted bit is assigned with a dummy BER value such that the local average BER is only computed over the valid bits inside the sliding window.

To evaluate the performance of rate adaptation based on predicted PER, the following simulation may be carried out. First, a plurality of random multipath channels may be generated. For each channel, the PER versus SNR for each data rate may be simulated. The data EVM values for each case may be recorded. All these data may be saved in a format (channel, rate, SNR, PER, EVM).

The predicted PER may be computed from the EVM values using the global average BER or the local average BER formulas. Therefore, the combined data may be saved in a format (channel, rate, SNR, PER, pred_PER). For each case of (channel, SNR), the ideal_throughput=rate*(1−PER) may be computed for all rates. The "ideal" rate adaptation rate is the rate that minimizes the throughput. For each case of (channel, SNR), the pred_throughput=rate*(1−pred_PER) may be computed for all rates. The rate that maximizes the predicted throughput may be chosen. The real_throughput=rate*(1−PER) may then be computed for the chosen rate. This real throughput value is the rate and throughput of the actual rate adaptation. After all (channel, SNR) entries are processed, the throughput efficiency of the actual rate adaptation as sum (real_throughput)/sum(ideal_throughput) and the percentage of choosing the wrong rate may be computed.

Table 1 summarizes the performance of rate adaptation using various forms of predicted PER:

TABLE 1

| Performance of Rate Adaptation Using Predicted PERs | Global Average BER | | Local Average BER | | |
|---|---|---|---|---|---|
| | Pilot EVM | Ideal Data EVM | Ideal Data EVM | Raw Data EVM | Corrected Data EVM |
| Throughput Efficiency | 84% | 84% | 98% | 56% | 97% |
| % of Choosing Wrong Rate | 31% | 30% | 8% | 51% | 14% |

Figure 4:
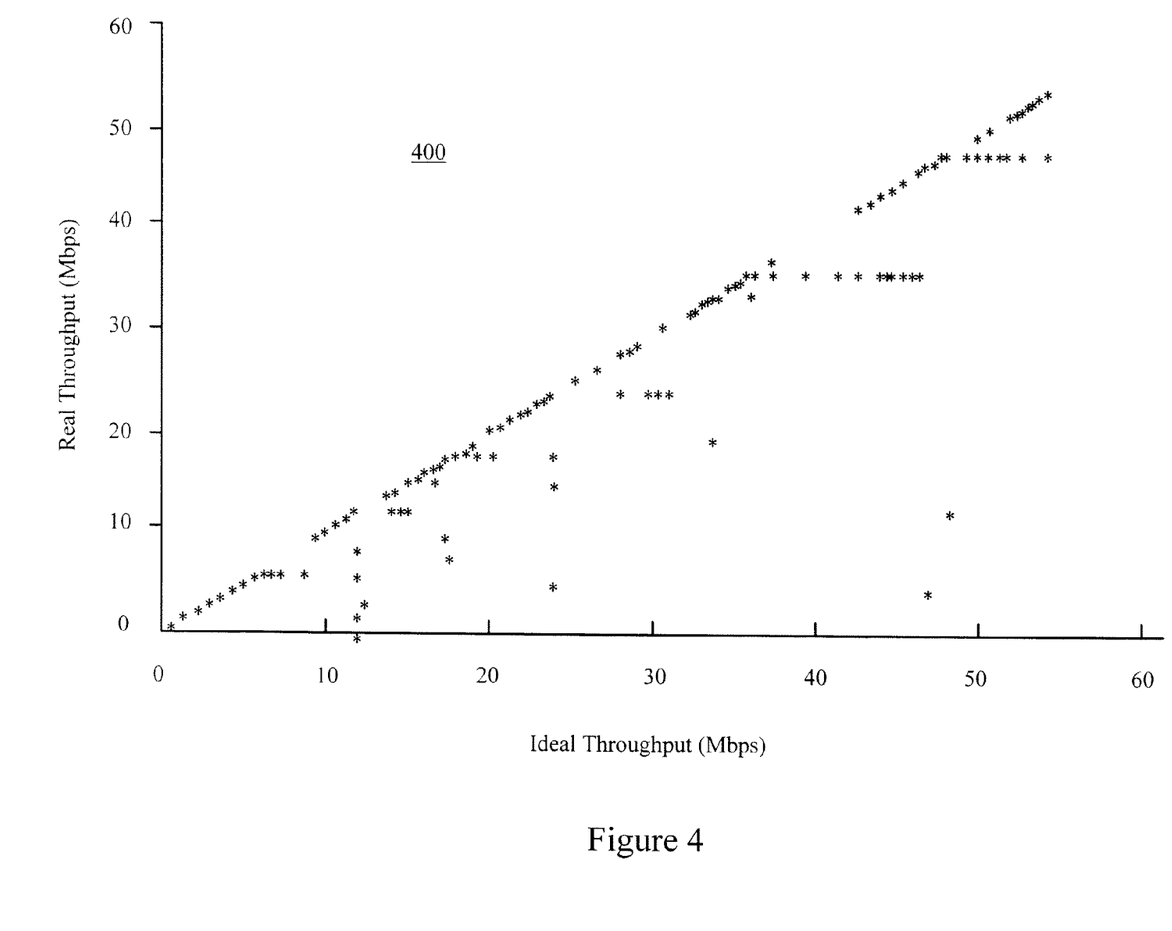
FIG. 4 shows a scatter plot of the ideal throughput versus the real throughput for the corrected data EVM.

For the above comparison, the window size used in the local average BER method is 20 bits, the number of channels is 20, the number of data rates is 8, and the SNR=[0:20]. Additionally, performance is apparently unaffected by taking into account the punctured bits. Table 1 indicates that for throughput efficiency, the local average BER method gives better prediction than the global average BER. Moreover, notably, the corrected data EVM performs almost as well as the ideal data EVM. FIG. 4 shows a scatter plot 400 of the ideal throughput versus the real throughput for the corrected data EVM.

Choosing Rate Adaptation Method

Both the average SNR and predicted PER techniques may be applied to spatial multiplexing MIMO systems. The decision on which technique to use depends on the usage scenario and the tradeoff of complexity and performance. For example, two typical usages and the corresponding recommendations are provided by way of illustration and not limitation. In a real time hardware implementation, an average SNR technique with pilot EVM values in the log domain can be used. In a MAC simulation in computer software, a predicted PER technique with local average BER can be used.

As taught above, the goal of rate adaptation is to maximize throughput. The throughput is a tradeoff between the data rate and the packet error rate (i.e. throughput=data rate×(1−PER)). PER may be characterized as a function of the mean of the EVM estimated from the pilots/data, as well as a function of the distribution of EVM (mostly negative tail behavior). Thus, EVM to PER mapping may benefit from both the first and second order moments of the estimated EVM.

Figure 5:
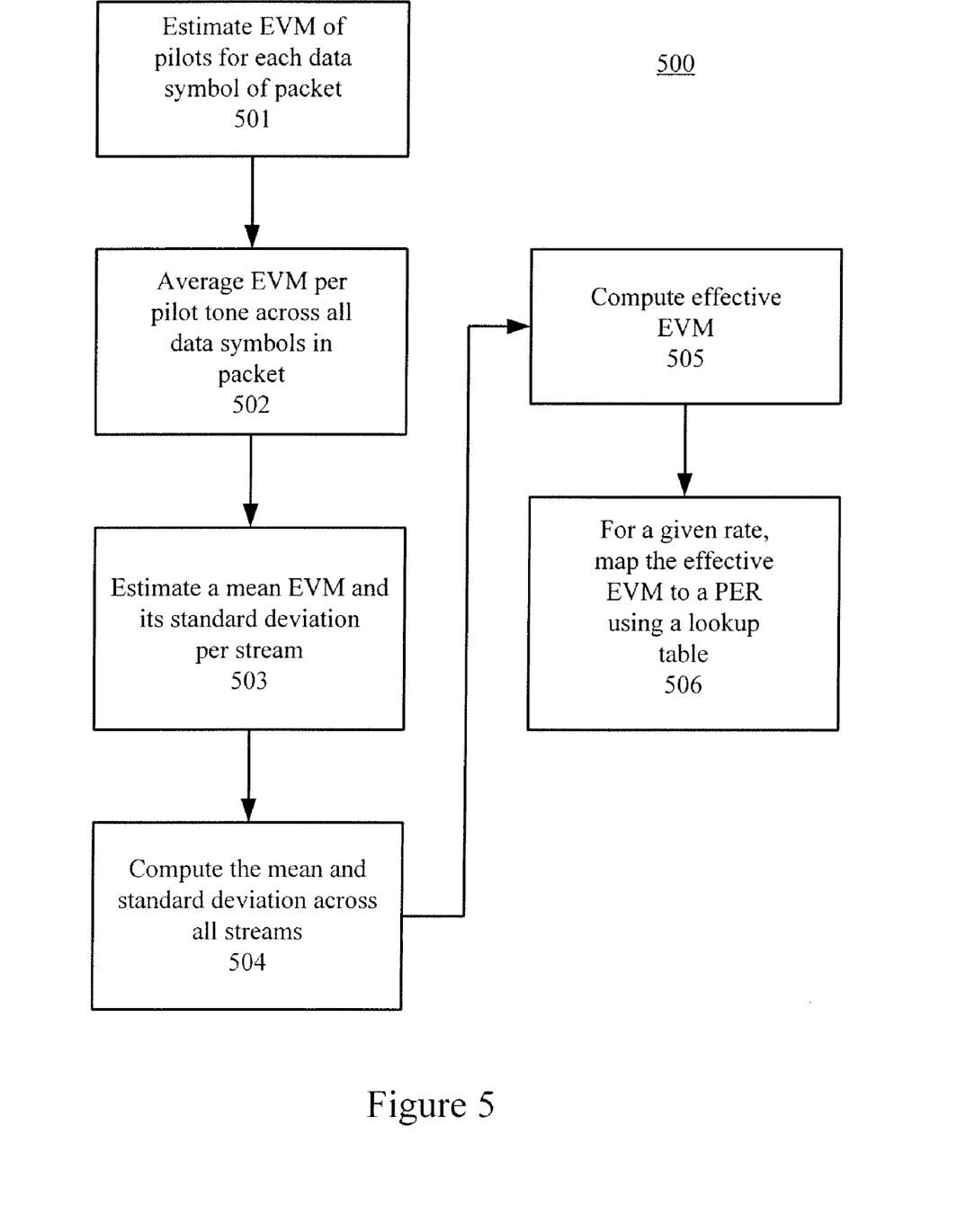
FIG. 5 illustrates an exemplary technique for generating a PER estimation based on first and second order moments of EVM for rate adaptation.

FIG. 5 illustrates an exemplary technique 500 for generating a PER estimation based on first and second order moments of EVM for rate adaptation. In general, technique 500 estimates the PER for a given rate from the EVM measurements and maps it into a throughput for a given rate. Rate adaptation then selects the rate that maximizes the throughput. In one embodiment, the PER computation is solely based on an EVM estimated from pilot values. Advantageously, this technique provides both low complexity (thereby providing a simple implementation) as well as an EVM to PER mapping that is insensitive to the type of propagation channel (thereby minimizing storage space requirements).

In technique 500, step 501 may estimate an EVM of the pilots for each data symbol in a packet. In step 502, the EVM per pilot tone may be averaged across all the data symbols in a packet. This averaging results in an EVM vector with a length of number of pilots. Note that for high throughput, there will be one EVM vector for each stream.

In step 503, a mean EVM and its standard deviation may be estimated for each stream. Note that the average and the standard deviation may be computed on the EVM quantity expressed in a logarithmic scale.

Step 504 may then compute the mean EVM and the standard deviation for all streams as shown by the following equations.

$$\mu_{EVM} = \frac{1}{N}\sum_{i=1}^{N}\mu_i$$

$$\sigma_{EVM} = \frac{1}{N}\sum_{i=1}^{N}\sigma_i$$

wherein $\mu_i$ the mean EVM for $i^{th}$ stream, $\sigma_i$ is the standard deviation of EVM for $i^{th}$ stream, and N is the number of streams.

Step 505 may compute the effective EVM=$\mu_{EVM}-\sigma_{EVM}$.

In step 506, for a given rate, the effective EVM may be mapped to a PER using a lookup table (i.e. one table for each rate). In one embodiment, this lookup table may be predetermined from simulations. Note that this lookup table is static irrespective of the type of propagation channel. PERs and data rates may then be used to compute throughputs, wherein the rate with the highest throughput is typically selected (see, e.g. steps 206 and 207 of FIG. 2).

Figure 6:
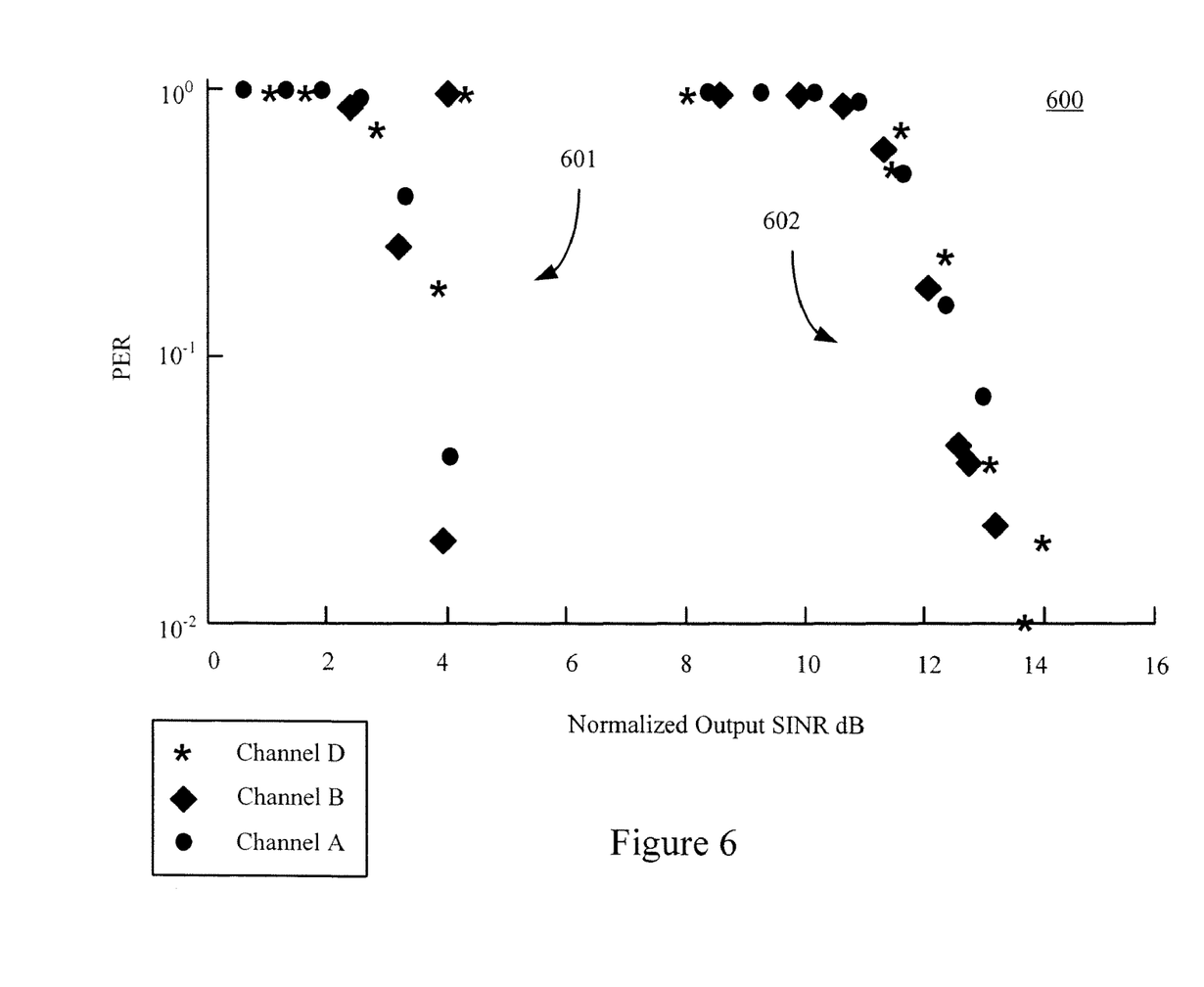
FIG. 6 illustrates a PER versus effective EVM graph for three channels (A, B, and D) and two rates (MCS=10, 12).

FIG. 6 illustrates a PER versus effective EVM (i.e. a normalized output SINR) graph 600 for three channels (A, B, and D) (TGn channel models) and two rates (wherein data points 601 represent MCS=10 (2 streams, QPSK-3/4) and data points 602 represent MCS=12(2 streams, 16-QAM-3/4)) during an exemplary simulation using the above technique 500. Note that although this simulation was run for a 3 transmit antenna and 3 receiver antenna case, the set of curves should be invariant to the number of antennas. Further note that, as seen from FIG. 6, irrespective of the channel type, the PER to effective EVM mapping remains constant. Therefore, if the effective EVM is computed for any given scenario, then the PER for any rate can be computed from static tables.

Figure 7A:
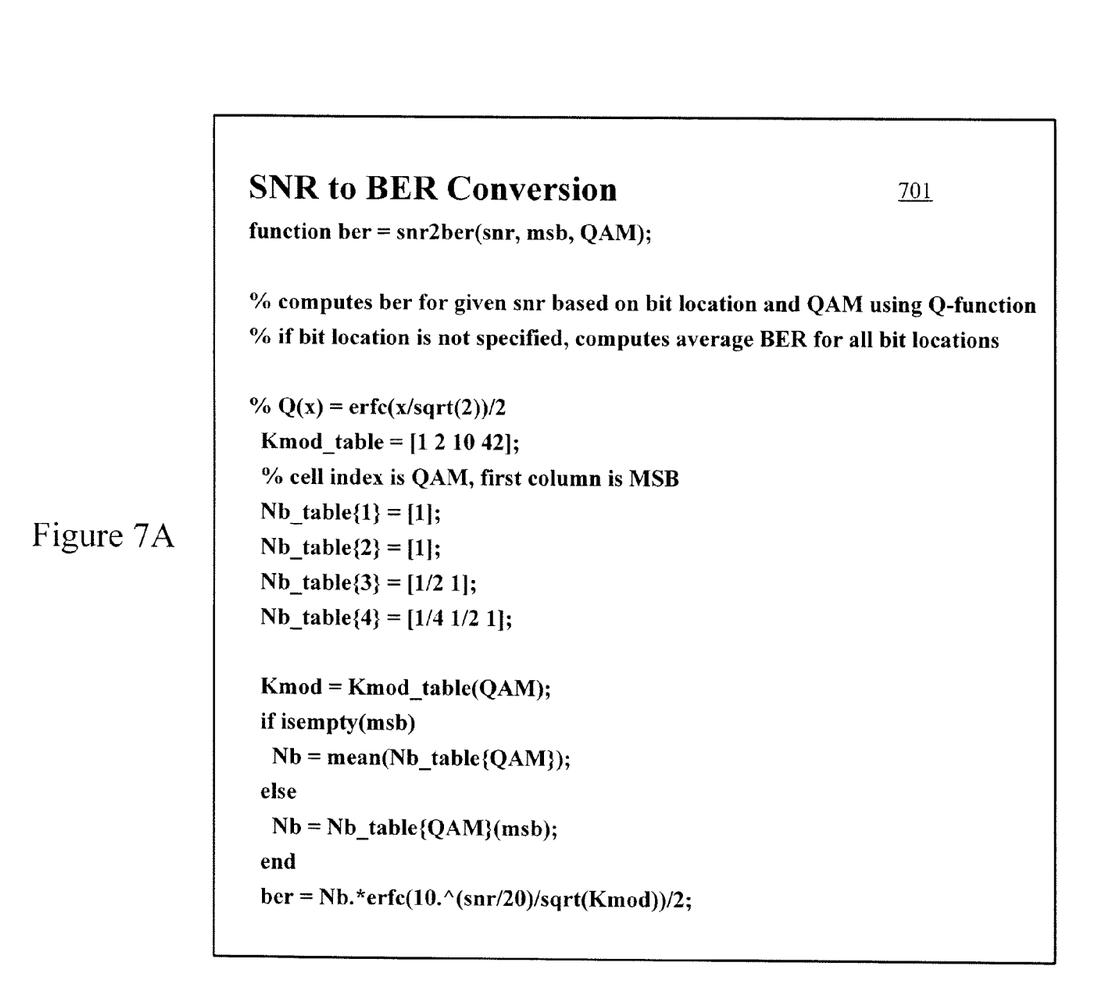
Figure 7B:
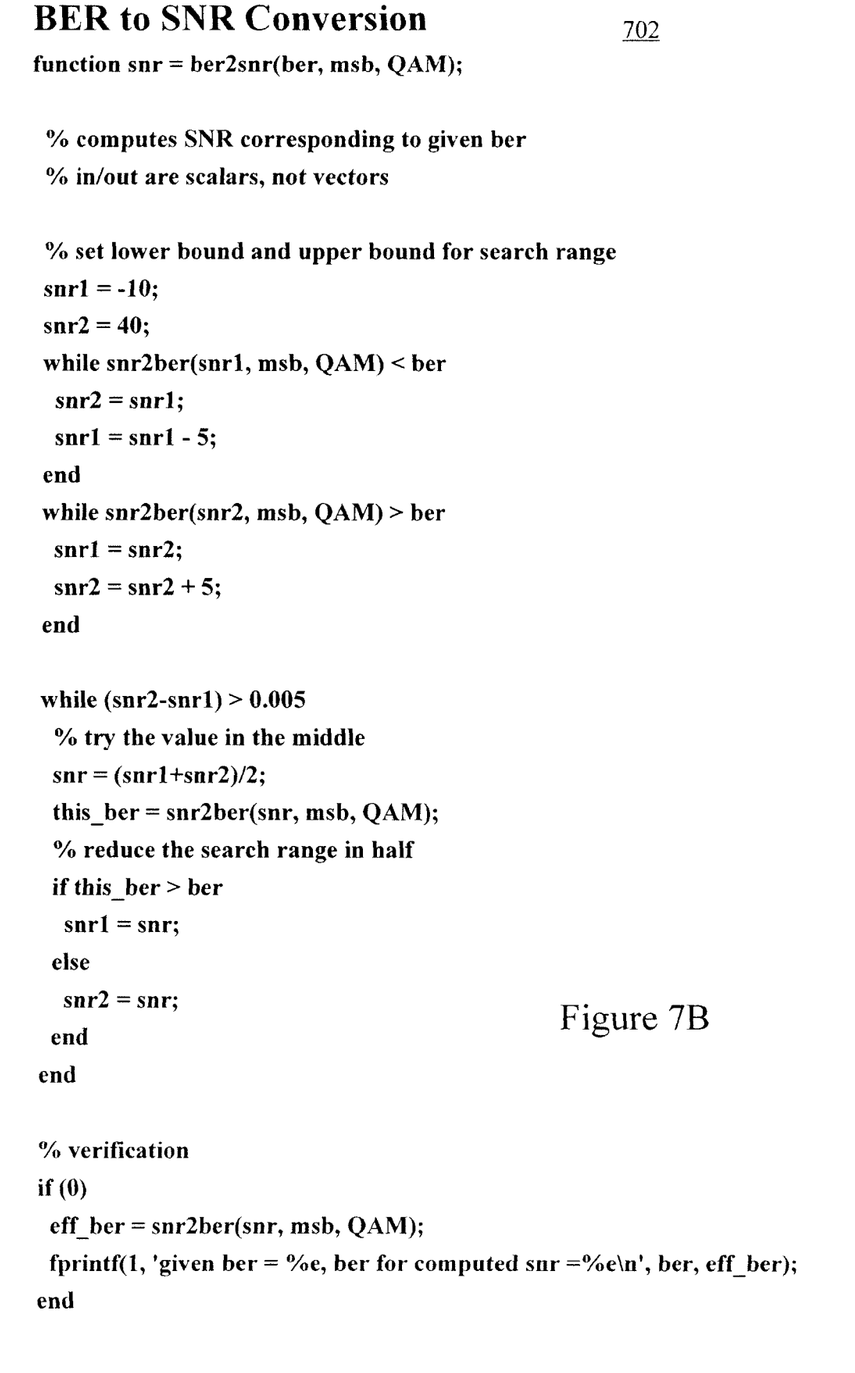
Figure 7C:
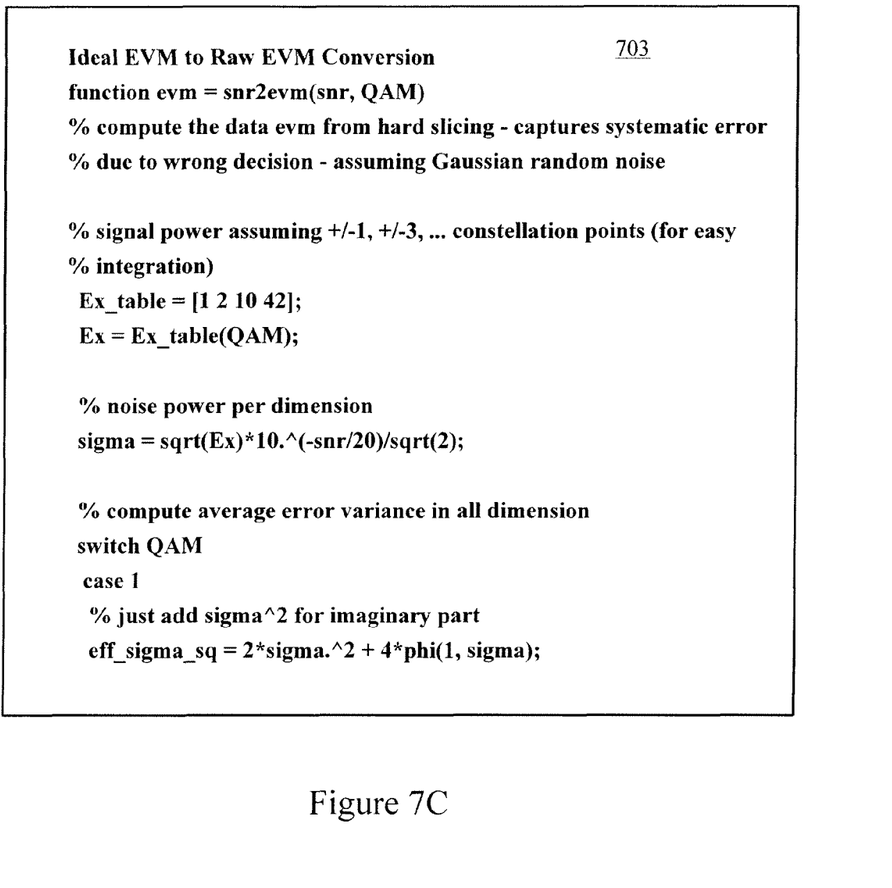
Figure 7D:
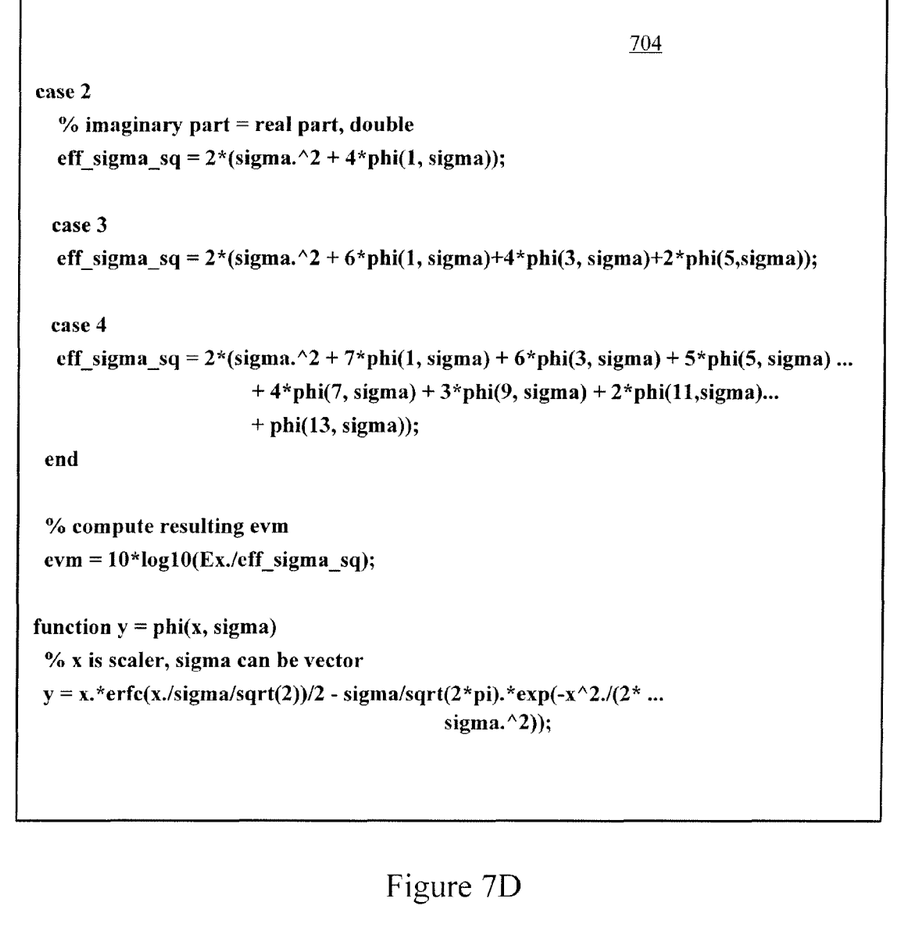
Figure 7E:
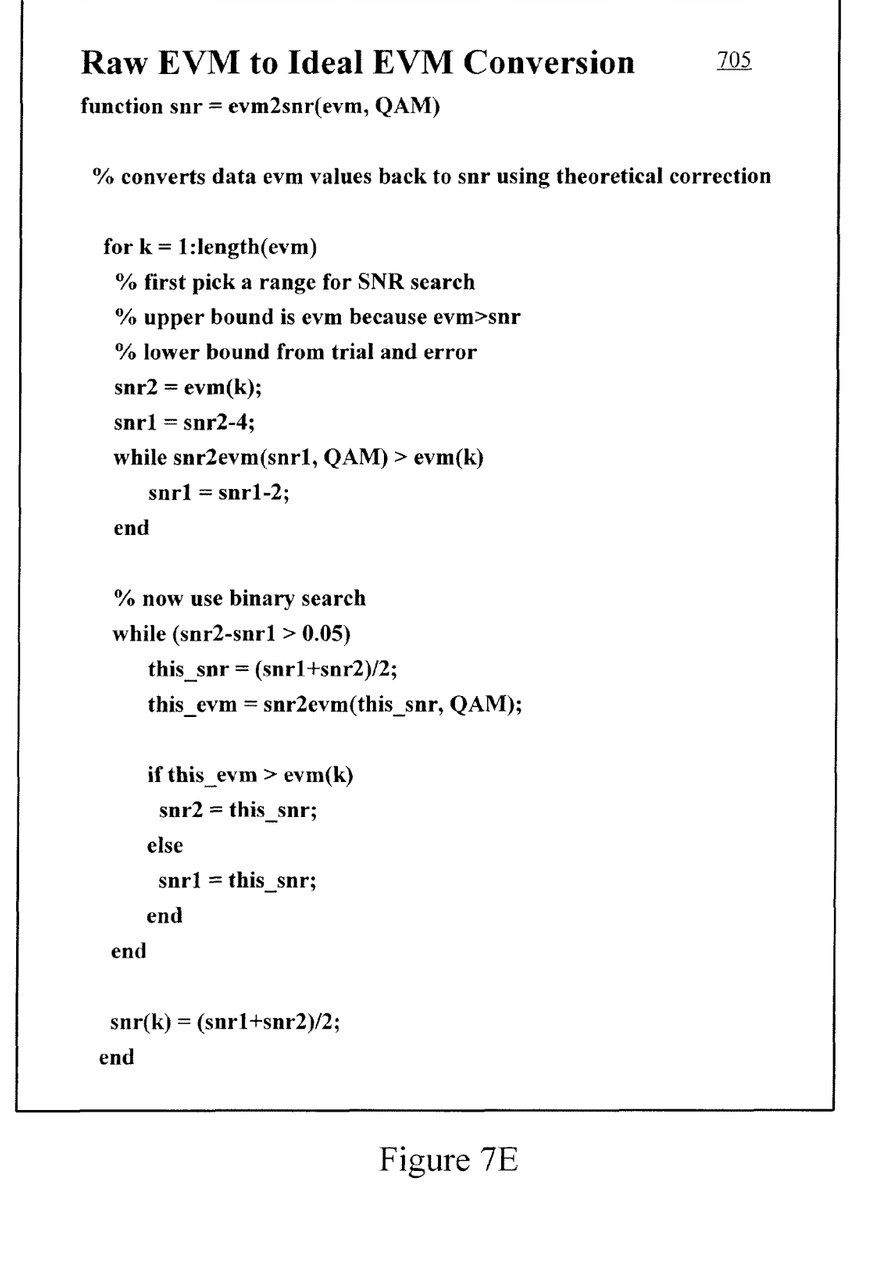

FIGS. 7A-7E illustrate Matlab codes that describe aspects of the embodiments provided herein. For example, FIG. 7A illustrates code 701 for SNR to BER conversion. FIG. 7B illustrates code 702 for BER to SNR conversion. FIGS. 7C and 7D illustrate code 703 and 704, respectively, for ideal EVM to raw EVM conversion. FIG. 7E illustrates code 705 for raw EVM to ideal EVM conversion.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of adapting a rate for a radio frequency device, the method comprising:

in a radio frequency device computing an average signal-to-noise ratio (SNR) from a plurality of error vector magnitude (EVM) values; and using the average SNR and a (SNR, rate) lookup table to determine an optimized rate,
wherein computing the average SNR includes:
  computing a bit error rate (BER) for each EVM value;
  computing an average BER for all EVM values; and
  determining an SNR corresponding to the average BER,
  wherein determining the average BER includes computing a local average BER for a de-interleaved bit sequence using a sliding window format.

2. The method of claim 1, wherein the EVM values include at least one of pilot EVM values and data EVM values.

3. A method of adapting a rate for a radio frequency device, the method comprising:
  in a radio frequency device computing error vector magnitude (EVM) values for a current packet;
  determining an average bit error rate (BER) using the EVM values for each data rate;
  determining an average signal-to-noise ratio (SNR) from the average BER;
  for each data rate, determining a predicted packet error rate (PER) using the average SNR and a PER versus SNR curve;
  for each data rate, computing a predicted throughput using the data rate and the predicted PER; and
  selecting a rate having a high predicted throughput,
  wherein determining the average BER includes computing a local average BER for a de-interleaved bit sequence using a sliding window format.

4. The method of claim 3, further including generating PER versus SNR curves, which comprises:
  simulating PER versus SNR curves for an additive white Gaussian noise (AWGN) channel for all data rates; and
  saving the PER versus SNR curves.

5. The method of claim 3, wherein the PER versus SNR curve is generated from an additive white Gaussian noise (AWGN) channel.

6. The method of claim 5, wherein determining the average BER includes averaging a BER over all bins with EVM values, thereby providing a global average BER.

7. The method of claim 6, wherein the EVM values include at least one of pilot EVM values and data EVM values.

8. The method of claim 5, wherein computing the local average BER comprises:
  for each data bin, computing a BER of each data bit using data EVM values, a modulation type, and a bit position;
  de-interleaving all BER values; and
  computing the local average BER in a the sliding window format using de-interleaved BER values.

9. A method of adapting a rate for a radio frequency device, the method comprising:
  in a radio frequency device for each rate, mapping an error vector magnitude (EVM) to a packet error rate (PER);
  computing a throughput for each data rate and PER; and
  selecting a data rate with a high throughput,
  wherein mapping the EVM to the PER includes:
    estimating EVMs of pilots for each data symbol in a packet;
    computing an average EVM per pilot across all data symbols in the packet;
    estimating a mean EVM and a standard deviation for each stream;
    computing the mean EVM and the standard deviation for all streams;
    computing an effective EVM; and
    using a lookup table to map the EVM to the PER.

* * * * *